(12) United States Patent
Chang

(10) Patent No.: US 9,750,232 B2
(45) Date of Patent: Sep. 5, 2017

(54) WATER-POLLUTANT SEPARATION DEVICE, WATER-POLLUTANT SEPARATION AND FILTRATION DEVICE, ORNAMENTAL FISH TANK WATER-POLLUTANT SEPARATION AND FILTRATION SYSTEM, AND HIGH DENSITY CULTIVATION WATER-POLLUTANT SEPARATION, FILTRATION AND OXYGEN AERATION SYSTEM

(71) Applicant: Junbin Chang, Jiangsu (CN)

(72) Inventor: Junbin Chang, Jiangsu (CN)

( * ) Notice: Subject to any disclaimer, the term of this patent is extended or adjusted under 35 U.S.C. 154(b) by 454 days.

(21) Appl. No.: 14/368,232

(22) PCT Filed: Dec. 27, 2012

(86) PCT No.: PCT/CN2012/087635
§ 371 (c)(1),
(2) Date: Jun. 23, 2014

(87) PCT Pub. No.: WO2013/097741
PCT Pub. Date: Jul. 4, 2013

(65) Prior Publication Data
US 2015/0257371 A1    Sep. 17, 2015

(30) Foreign Application Priority Data
Dec. 27, 2011    (CN) .......................... 2011 2 0553103

(51) Int. Cl.
*B01D 21/00* (2006.01)
*B01D 21/24* (2006.01)
(Continued)

(52) U.S. Cl.
CPC .......... *A01K 63/045* (2013.01); *A01K 63/042* (2013.01); *B01D 21/0054* (2013.01);
(Continued)

(58) Field of Classification Search
None
See application file for complete search history.

(56) References Cited

U.S. PATENT DOCUMENTS 2,602,465 A * 7/1952 Goehring ............... B65D 88/54
                                                              137/582
4,295,973 A * 10/1981 Jain ........................ B01D 21/01
                                                              210/738
(Continued)

FOREIGN PATENT DOCUMENTS

CN        101091465        12/2007
CN        201123316 Y  *  10/2008
(Continued)

OTHER PUBLICATIONS

CN 201123316 Y Machine Translation.pdf—Zheng, D.—Oct. 1, 2008.*

*Primary Examiner* — Krishnan S Menon
*Assistant Examiner* — Bradley R Spies
(74) *Attorney, Agent, or Firm* — Vidas, Arrett & Steinkraus

(57) ABSTRACT

The present invention, relating to a water-pollutant separation device, on which a water-pollutant separation and filtration device, an ornamental fish tank water-pollutant separation and filtration system, and a high density cultivation water-pollutant separation, filtration and oxygen aeration system are based on, comprises a tank, a water inlet pipe and a water outlet pipe respectively communicated with the top of the separation tank, and a pollutant discharge pipe disposed at the bottom of the tank; the inner cavity of the tank is provided with a separation structure which is in an inverted barrel shape, having an upper closing cover and slightly smaller external dimensions than that of the tank which provides a gap between the separation structure and the bottom of the tank; a spoiler is installed onto the water (Continued)

inlet pipe after the water inlet pipe passes through the upper closing cover of the separation structure in the tank; the spoiler is sealed at the lower end, and is provided with a plurality of openings or slots on the side wall to generate a subcritical flow to spoil the water flow, the openings or slots being biased in the same direction. In the technical solution, a water-pollutant separation device is preferably added prior to fish tank filtration, and the multiple slots provided on the spoiler are suitable for splitting the flow of relatively large water flow, so that most pollutants in the water can be separated and discharged, thus reducing the accumulation of the pollutants on filtration material, and improving water quality and stability.

17 Claims, 4 Drawing Sheets

(51) Int. Cl.
*B01D 35/02* (2006.01)
*A01K 63/04* (2006.01)
*B01D 29/56* (2006.01)
*A01K 63/00* (2017.01)

(52) U.S. Cl.
CPC ......... *B01D 21/2405* (2013.01); *B01D 29/56* (2013.01); *B01D 35/02* (2013.01)

(56) References Cited

U.S. PATENT DOCUMENTS 7,293,658 B2  11/2007  Cummins
2011/0296987 A1* 12/2011  Buhrman ............... B01D 45/16
                                                    95/34

FOREIGN PATENT DOCUMENTS

CN      102630630      8/2012
GB      2146013        4/1985

* cited by examiner

WATER-POLLUTANT SEPARATION DEVICE, WATER-POLLUTANT SEPARATION AND FILTRATION DEVICE, ORNAMENTAL FISH TANK WATER-POLLUTANT SEPARATION AND FILTRATION SYSTEM, AND HIGH DENSITY CULTIVATION WATER-POLLUTANT SEPARATION, FILTRATION AND OXYGEN AERATION SYSTEM

FIELD OF THE INVENTION

The present invention relates to a water-pollutant separation device, on which a water-pollutant separation and filtration device, an ornamental fish tank water-pollutant separation and filtration system, and a high-density cultivation water-pollutant separation, filtration and oxygen aeration system are based on.

BACKGROUND OF THE INVENTION

In the field of fish farming, the maintenance of water takes more precedence. The water quality determined by the organic content and dissolved oxygen has a great influence on keeping fish. The organic content in the aquatic water comes from the excretions of the fish and the remained fish food, most of which is remained in the form of particles at the bottom of the fishpond.

In the prior art, the mechanism of the filtration system for fish-tank is that internal filtration materials blocks the particles pollutant to purify the water. As time goes on lots of pollutant will accumulate on the filtration materials. This will reduce the water flow rate and the filtration effect, so washing the filtration materials is a time-consuming work. One preferred example for the industrialized fish farming is that a sedimentation tank or a rotating separation module is used for separating and discharging the particles pollutant, and then a biological filtration treatment is applied to purify the water. However, these schemes remain many disadvantages, for instance, the separation effect for the sedimentation tank or a rotating separation module is very low because of the huge force applied to the particles by the strong water flow. To reach an ideal effect, the sedimentation tank or a rotating separation module should be enlarged to a large scale. In this condition, the pollutant discharging and the back flushing need a high quantity of water. So a powerful filtration system and a large quantity of fresh water are needed to maintain the water quality with a high construction cost and a low use ratio.

SUMMARY OF THE INVENTION

The object of the present invention is to provide a water-pollutant separation device free of disassembling and cleaning and easy for discharging pollutant, on which a water-pollutant separation and filtration device, an ornamental fish tank water-pollutant separation and filtration system, and a high-density cultivation water-pollutant separation, filtration and oxygen aeration system that are based on.

In order to obtain one or more of these objects, the present invention provides a water-pollutant separation device, comprising a tank, a water inlet pipe and a water outlet pipe respectively communicated with the top of the tank, and a pollutant discharge pipe communicated with the bottom of the tank, wherein, the inner cavity of the tank is provided with a separation structure being in such an inverted-barrel shape that has an upper closing cover, a slightly smaller external dimension than that of the tank, a gap from the bottom of the tank, and a spoiler, which is installed onto the water inlet pipe after which goes through the upper closing cover of the separation structure in the tank, having a sealed lower-end and a plurality of openings or slots on the side-wall to generate subcritical flow to spoil the water flow. The technical scheme presents a water-pollutant separation device before the filtration treatment for fish tank, in which the openings or slots on the side-wall of the spoiler shunt the strong water into flows so that the pollutant in the water can be easily separated and discharged. With less pollutant accumulating in the filtration materials, the water quality can be improved and stable.

Preferably, the dimensions of the openings or slots on the side-wall of the spoiler gradually decrease from the top to the bottom, thus ensuring the efficiency of the spoiler with a weak water flow.

Preferably, the upper closing cover of the separation structure has a spherical appearance that is hard for pollutant accumulating.

Preferably, the openings or slots on the side wall of the spoiler being biased in the same direction.

Preferably, a number of spiral leaves, which are biased in the same direction with the openings or slots, are arranged onto the inner-wall of the separation structure to swirl the water.

Preferably, the inner-wall of the separation structure is provided with filtration materials.

According to another aspect, the present invention provides a water-pollutant separation and filtration device based on the water-pollutant separation device mentioned above, comprising a tank, a water inlet pipe and a water outlet pipe respectively communicated with the top of the tank, a pump, a pollutant discharge pipe communicated with the bottom of the tank, and a back-flush pipe provided with a back-flush valve communicating the water inlet pipe and the water outlet pipe, wherein, the upper inner cavity of the tank is provided with multiple layers of filtration materials; the lower inner cavity of the tank is provided with a separation structure being in such an inverted-barrel shape that has an upper closing cover, a slightly smaller external dimension than that of the tank, a gap from the bottom of the tank, and a spoiler, which is installed onto the water inlet pipe after which goes through the upper closing cover of the separation structure in the tank, having a sealed lower-end and a plurality of openings or slots on the side-wall biased in the same direction to generate a subcritical flow to spoil the water flow. The technical scheme presents a filtration device to the water-pollutant separation device, thus the pollutant in the water can be easily separated and discharged. With less pollutant accumulating in the filtration materials, the water quality can be improved and stable resulting in less cleaning work. The designing spirit of the device is that:

(1) The water-pollutant separation device is arranged under a filtration device, which comprises a spoiler for shunting and generating weak flows and several spiral leaves for swirling the flows. The circulating water is converted into weak swirling flows when getting through the water-pollutant separation device under the function of the spoiler and spiral leaves, during which most particles in the water falling to the center area of the bottom of the filtration device because of gravity thus finishing a primary water-pollutant separation process.

(2) Multiple layers of filtration materials are arranged in the upper part of the filtration device. When the circulating water after the primary water-pollutant separation process getting through filtration materials, the tiny particles left in the water after the primary water-pollutant separation process are sediment or absorbed to the filtration materials because of obstruction thus finishing a secondary water-pollutant separation process, during which a biological filtration treatment is applied to the circulating water by the filtration materials in the same time.

(3) A pollutant discharge pipe with a pollutant discharge valve is communicated with the bottom of the filtration device which is center-inclined. When the pollutant discharge valve is turned on, the sedimented particles in the center area of the bottom of the filtration device can be discharged easily.

(4) A water inlet pipe and a water outlet pipe are respectively communicated with the top of the filtration device, also a controlling valve and a back-flush pipe provided with a back-flush valve are communicated with the water outlet pipe. When the pollutant discharge valve is turned on to discharge pollutant, the tiny particles absorbed to the filtration materials can be also discharged out of the filtration device by back-flows with the controlling valve off and back-flush valve on.

Preferably, the lower layers of filtration materials have a less density than the upper layers of filtration materials, and a net spacing is provided between each layer of filtration materials.

According to still another aspect, the present invention provides ornamental fish tank water-pollutant separation and filtration system comprising a tank, wherein, the inner cavity of the tank is divided by a clapboard into the bottom-water filtration area on one side and the upper-water filtration area on the other side communicating with each other through a opening on the upper part of the clapboard, and a bottom-water inlet pipe corresponding to the bottom-water filtration area and an upper-water inlet pipe corresponding to the upper-water filtration area are communicated with the top of the tank, and a pollutant discharge pipe corresponding to the bottom-water filtration area and a water discharge pipe corresponding to the upper-water filtration area are communicated with the bottom of the tank, wherein, the bottom-water filtration area is provided with a separation structure being in such an inverted-barrel shape that has an upper closing cover, a slightly smaller external dimension than that of the tank, a gap from the bottom of the tank, and a spoiler, which is installed onto the water inlet pipe after which goes through the upper closing cover of the separation structure in the tank, having a sealed lower-end and a plurality of openings or slots on the side-wall to generate subcritical flow; the upper-water filtration area is provided with multiple layers of filtration materials, under which a water outlet pipe is communicated so that the filtered water is constantly imported to the ornamental fish tank under the action of the pump. The technical scheme has the advantages that the pollutant in the water can be easily separated and discharged with less pollutant accumulating in the filtration materials, thus the water quality can be improved and stable resulting in less cleaning work.

Preferably, the upper closing cover of the separation structure has a spherical appearance that is hard for pollutant accumulating and easy for cleaning.

Preferably, the dimensions of openings or slots on the side-wall of the spoiler gradually decrease from the top to the bottom to generate uniform water flows.

Preferably, the openings or slots are biased in the same direction, and the cross-section of the spoiler is provided with a round profile along the tangential direction of which the slots on the side wall of the spoiler extend. So, this reduces the probability of collision between the particles pollutant and the side-wall of the bottom-water filtration area by achieving the best rotating efficiency, during which the particles pollutant may be crashed into more tiny particles (that may go into the next filtration system with the water flow) which may decompose organic matters that pollutant the water and not easy to separate.

Preferably, the slots of the spoiler are connected to the side-wall by round corners so that particles pollutant passes easily.

Preferably, a number of spiral leaves, which are biased in the same direction with the openings or slots, are arranged onto the inner-wall of the separation structure to swirl the water.

Preferably, the inner-wall of the separation structure is provided with filtration materials.

Preferably, a number of brushes are arranged above the separation structure in the bottom-water filtration area.

Preferably, the bottoms of the bottom-water filtration area and the upper-water filtration area are center-inclined respectively, easy for the pollutant sedimenting and discharging.

Preferably, a pollutant insulation board having a plurality of openings is arranged under the separation structure in the bottom-water filtration area for the particles pollutant sedimenting efficiently.

According to yet another aspect, the present invention provides a high-density cultivation water-pollutant separation, filtration and oxygen aeration system, comprising:

a water-pollutant separation device, comprising a water-pollutant separation tank and a water-pollutant separation structure disposed inside the water-pollutant separation tank, the water-pollutant separation structure being in such an inverted-barrel shape that has an upper closing cover, a slightly smaller external dimension than that of the water-pollutant separation tank, a gap from the bottom of the water-pollutant separation tank, and a spoiler installed onto a bottom-water inlet pipe after which goes through the upper closing cover of the water-pollutant separation structure in the water-pollutant separation tank, the spoiler having a sealed lower-end and a plurality of openings or slots on the side-wall to generate subcritical flow to spoil the water, and a pollutant discharge pipe being communicated with the bottom of the water-pollutant separation tank;

a primary filtration device communicated with the water-pollutant separation device, comprising a primary filtration tank, primary filtration materials disposed inside the primary filtration tank, and an upper-water inlet pipe communicated with the primary filtration tank;

a secondary filtration and oxygen aeration device communicated with the primary filtration device, comprising a secondary filtration and oxygen aeration tank, secondary filtration materials and an oxygen aeration disk disposed inside the secondary filtration and oxygen aeration tank, and a water-outlet pipe and a water-discharge pipe communicating with the secondary filtration and oxygen aeration tank. The technical scheme has the advantages that the pollutant in the water can be easily separated and discharged with less pollutant accumulating in the filtration materials, thus the water quality can be improved and stable resulting in less cleaning work. Also, the scheme provides a simple structure with a low cost, a high oxygen dissolving efficiency, a high oxygen utilization rate, and good result of Water conservation, sterilization and disinfection.

Preferably, the upper closing cover of the water-pollutant separation structure has a spherical appearance that is hard for pollutant accumulating and easy for cleaning.

Preferably, the dimensions of openings or slots on the side-wall of the spoiler gradually decrease from the top to the bottom to generate uniform water flows.

Preferably, the openings or slots are biased in the same direction, and the cross-section of the spoiler is provided with a round profile along the tangential direction of which the slots on the side-wall of the spoiler extend. So, this reduces the probability of collision between the particles pollutant and the side-wall of the water-pollutant separation tank by achieving the best rotating efficiency, during which the particles pollutant may be crashed into more tiny particles (that may go into the next filtration system with the water flow) which may decompose organic matters that pollutant the water and not easy to separate.

Preferably, the slots of the spoiler are connected to the side-wall by round corners so that particles pollutant passes easily.

Preferably, a number of spiral leaves, which are biased in the same direction with the openings or slots, are arranged onto the inner-wall of the water-pollutant separation structure to swirl the water.

Preferably, filtration materials are arranged onto the inner-wall of the water-pollutant separation structure.

Preferably, a number of brushes are arranged above the water-pollutant separation structure in the bottom-water filtration area.

Preferably, the bottoms of water-pollutant separation device and the secondary filtration and oxygen aeration device are center-inclined respectively, easy for the pollutant sedimenting and discharging.

Preferably, a pollutant filtration insulation board having a plurality of openings is arranged under the water-pollutant separation structure inside the water-pollutant separation tank for the particles pollutant sedimenting efficiently.

BRIEF DESCRIPTION OF THE DRAWINGS

In the course of this detailed description below, references will be made to the drawings, in which.

DETAILED DESCRIPTION OF THE PREFERRED EMBODIMENTS

The detailed description of the preferred embodiment according to the invention is given as below with the accompanying drawings so that the benefits and features of the present invention are understood for those skilled in the art.

Figure 1:
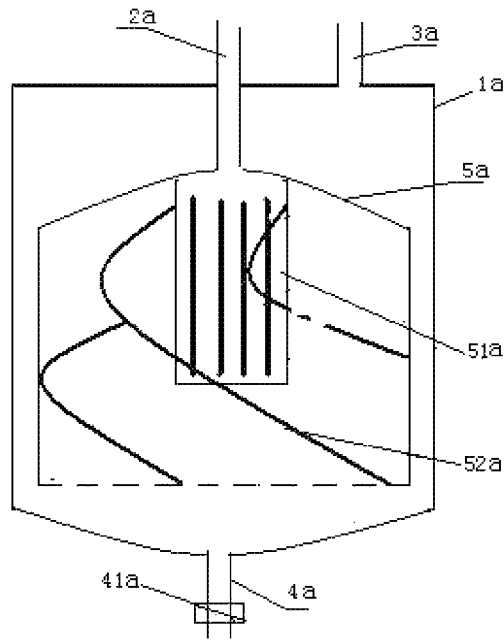
FIG. 1 is a schematic view of the first embodiment of the water-pollutant separation device according to the present invention.

As shown in FIG. 1, the water-pollutant separation device of the embodiment comprises a tank $1a$, a water inlet pipe $2a$ and a water outlet pipe $3a$ respectively communicated with the top of the tank $1a$, a pollutant discharge pipe $4a$ with a pollutant discharge valve $41a$ communicated with the bottom of the tank $1a$. The bottom of the tank $1a$ is center-inclined towards the pollutant discharge pipe $4a$ so that the sedimented particles pollutant in the center area of the bottom can be discharged easily.

The inner cavity of the tank $1a$ is provided with a separation structure $5a$ being in such an inverted-barrel shape that has an upper closing cover with a spherical appearance, a slightly smaller external dimension than that of the tank $1a$, and a gap from the bottom of the tank $1a$. The water inlet pipe $2a$ goes through the upper closing cover of the separation structure $5a$ in the tank $1a$ and is connected with a spoiler $51a$. The spoiler $51a$ is provided with an upper end communicated to the water inlet pipe $2a$, a sealed lower-end and a side-wall having a plurality of slots (or openings) to generate subcritical flow to spoil the water flow. A number of spiral leaves $52a$, which are biased in the same direction with the slots (or openings), are arranged onto the inner-wall of the separation structure $5a$ to swirl the water. With the cooperation of the spiral leaves $52a$ and the slots (or openings), the water in the separation structure $5a$ swirls to separate the pollutant. Preferably, the dimensions of openings or slots on the side-wall of the spoiler $51a$ gradually decrease from the top to the bottom, generating uniform water flows in the effective area on the side-wall of the spoiler $51a$ with a better separation effect. In addition, the upper closing cover of the separation structure $5a$ has a spherical appearance that is hard for pollutant accumulating and easy for cleaning.

Figure 2:
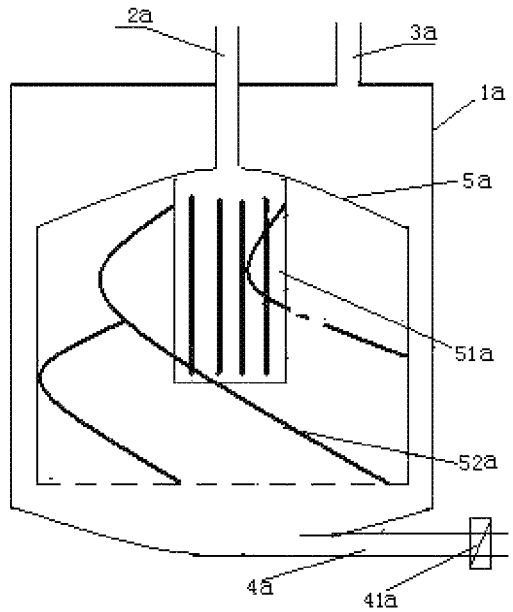
FIG. 2 is a schematic view of a second embodiment of the water-pollutant separation device according to the present invention.
Figure 3:
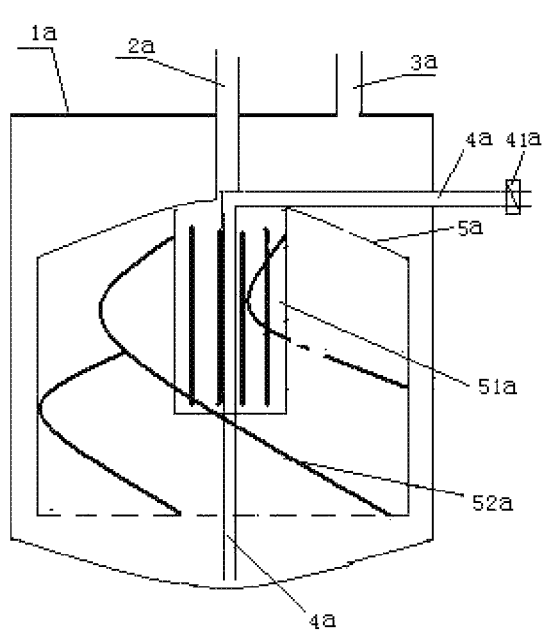
FIG. 3 is a schematic view of a third embodiment of the water-pollutant separation device according to the present invention.

FIG. 2 and FIG. 3 are schematic views of a second and a third embodiment of the water-pollutant separation device according to the present invention, which have a similar structure with the embodiment in FIG. 1. The difference is that the pollutant discharge pipe $4a$ for discharging pollutant at the bottom of the tank $1a$ is extending along the horizontal direction below the bottom of the tank $1a$ to reduce the total product height (as shown in FIG. 2), or is extending along the horizontal direction inside the tank 1a (as shown in FIG. 3).

When the device in a normal working state, the pollutant discharge pipe valve 41a is turned off and dirty water goes into the spoiler 51a through the water inlet pipe 2a inside the separation structure 5a. With the shunting function of the slots, the cycling water loses impact force and becomes smooth, and then starts whirling in the same direction under the function of the spiral leaves 52a, gathering most particles pollutant within a central area of the bottom of the tank 1a. After that, the water goes upwards slowly through the gap between the bottom of the tank 1a and the separation structure 5a and enters a filtration system through the water outlet pipe to apply a second level separation, and finally is sent into the fish-tank by a cycling water pump. The upper closing cover of the separation structure has a spherical appearance that is hard for pollutant accumulating. Particles pollutant sedimented within the central area of the bottom of the tank 1a can be easily discharged by turning on the pollutant discharge pipe valve 41a at any time with less water, reaching the object of the invention that pollutant water separation is no longer a difficult for fish farming and meets the concept of low carbon.

According to another aspect, the present invention provides a water-pollutant separation and filtration device as below based on the various water-pollutant separation devices mentioned above.

Figure 4:
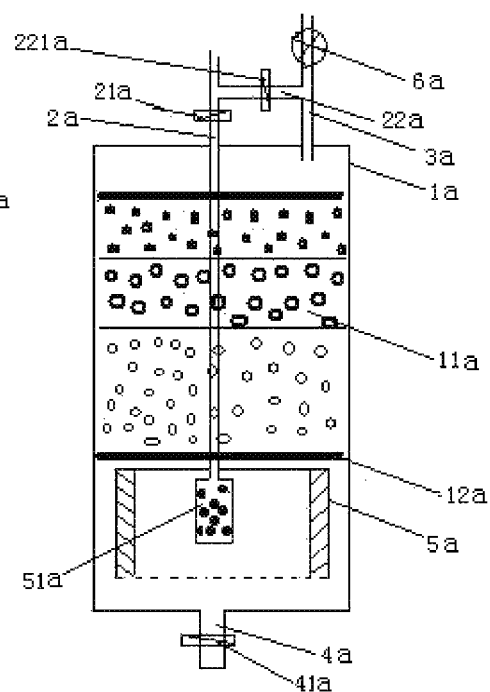
FIG. 4 is a schematic view of the first embodiment of the water-pollutant separation and filtration device according to the present invention.

As shown in FIG. 4, the water-pollutant separation and filtration device for ornamental fish tanks comprises a tank 1a, a water inlet pipe 2a and a water outlet pipe 3a respectively communicated with the top of the tank 1a, a pump 6a arranged to the water outlet pipe 3a, and a back-flush pipe 22a provided with a back-flush valve 221a communicating the water inlet pipe 2a and the water outlet pipe 3a. A three-way ball valve 21a is arranged at the junction of the water inlet pipe 2a and the back-flush pipe 22a. A pollutant discharge pipe 4a with a pollutant discharge valve 41a is communicated with the bottom of the tank 1a for discharging pollutant. The bottom of the tank 1a is center-inclined towards the pollutant discharge pipe 4a so that the sedimented particles pollutant in the center area of the bottom can be discharged easily with little water. The upper inner cavity of the tank 1a is provided with multiple layers of filtration materials 11a, and the lower layers of filtration materials 11a have a less density than the upper layers of filtration materials 11a, and a net spacing 12a is provided between each layer of filtration materials 11a. In this embodiment, the filtration materials 11a comprise carbon cotton in the upper layer, filer pieces in the middle layer, and brushes in the bottom layer.

The lower inner cavity of the tank 1a is provided with a separation structure 5a being in such an inverted-barrel shape that has an upper closing cover, a slightly smaller external dimension than that of the tank 1a, a gap from the bottom of the tank 1a. A spoiler 51a, which is installed onto the water inlet pipe 2a after which goes through the upper closing cover of the separation structure 5a in the tank 1a, has an upper end connected to the water inlet pipe 2a, a sealed lower end and a side-wall provided with a plurality of openings (or slots) biased and oriented in the same direction of left or right to generate a subcritical flow to spoil the water flow. A number of spiral leaves 52a shown in FIG. 1 to 3 can be arranged onto the inner-wall of the separation structure 5a to generate a cooperation effect of the spiral leaves 52a and the slots (or openings). Preferably, the dimensions of openings or slots on the side-wall of the spoiler 51a gradually decrease from the top to the bottom, generating uniform water flows in the effective area on the side-wall of the spoiler 51a with a better separation effect. In addition, the upper closing cover of the separation structure 5a can be a spherical appearance. The above descriptions are not limited to the examples shown in descriptions (or drawings) hereinbefore, and other modifications varied in efficient manners within the scope of the present invention can be made.

A basic operating principle and process of this preferred embodiment is given herein below. When the device in a normal working state, the pollutant discharge pipe valve 41a is turned off, and the three-way ball valve 21a is set to open the water inlet pipe 2a and block the back-flush pipe 22a. The dirty water of the fish tank goes into the spoiler 51a through the water inlet pipe 2a inside the separation structure 5a. With the shunting function of the holes (or slots), the cycling water loses impact force and becomes smooth, and then starts whirling to left (or right) under the function of the left (or right) biased holes, gathering most particles pollutant within a central area of the bottom of the tank 1a. After that, water with tiny particles go upwards slowly through the gap between the bottom of the tank 1a and the separation structure 5a. So tiny particles are blocked by the filtration materials 11a, and finally filtered cycling water is sent into the fish-tank by a cycling water pump. Particles pollutant sedimented within the central area of the bottom of the tank 1a can be easily discharged by turning on the pollutant discharge pipe valve 41a at any time with less water. Tiny particles pollutant absorbed on the filtration materials 11a can be easily discharged out of the tank 1a with back-flush flows by setting the three-way ball valve 21a (block the water inlet pipe 2a and open the back-flush pipe 22a) at the time of pollutant discharging.

Figure 5:
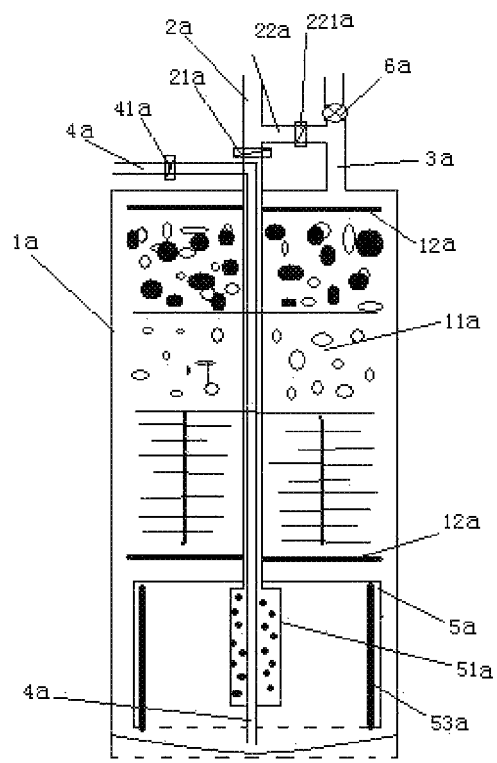
FIG. 5 is a schematic view of a second embodiment of the water-pollutant separation and filtration device according to the present invention.

FIG. 5 is a schematic view of a second embodiment of the water-pollutant separation and filtration device according to the present invention, which has a similar structure with the embodiment in FIG. 4. The difference is that the pollutant discharge pipe 4a for discharging pollutant at the bottom of the tank 1a is extending along the horizontal direction inside the tank 1a from bottom to top and then stretch out to reduce the total product height. Still, low density filtration materials 52a, such as brushes made into circle plate or the like, are arranged on the inner side-wall of the separation structure 5b to enhance the filtration effect of weak flow.

Figure 6:
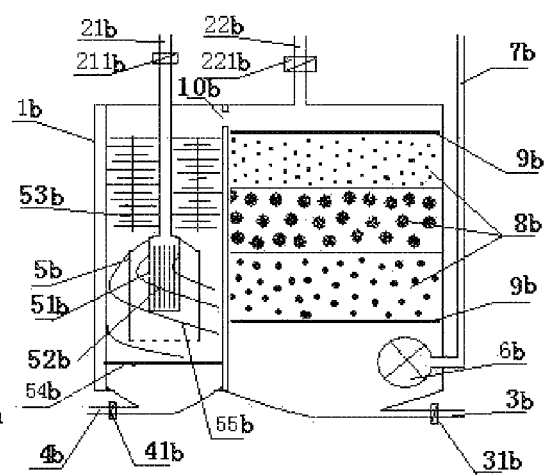
FIG. 6 is a schematic view of one embodiment of the ornamental fish tank water-pollutant separation and filtration system according to the present invention.
Figure 7:
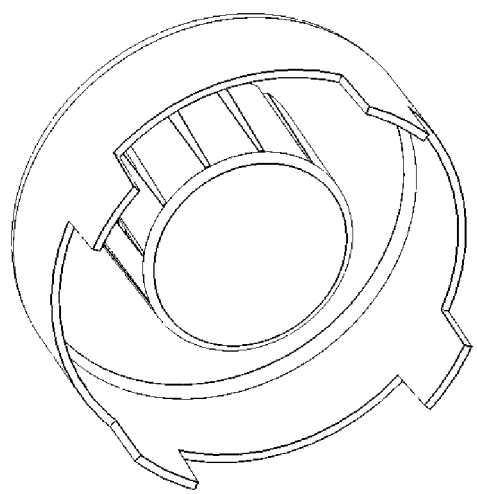
FIG. 7 is a schematic view of the water-pollutant separation structure according to the present invention.

FIG. 6 is a schematic view of one embodiment of the ornamental fish tank water-pollutant separation and filtration system according to the present invention. The inner cavity of the tank 1b is divided by clapboard into the bottom-water filtration area on the left side and the upper-water filtration area on the right side communicating with each other through an opening 10b on the upper part of the clapboard. A bottom-water inlet pipe 21b corresponding to the bottom-water filtration area and an upper-water inlet pipe 22b corresponding to the upper-water filtration area are communicated with the top of the tank 1b. The bottom-water inlet pipe 21b is controlled by the bottom-water inlet valve 211b, and the upper-water inlet pipe 22b is controlled by the upper-water inlet valve 221b. A pollutant discharge pipe 4b corresponding to the bottom-water filtration area and a water discharge pipe 3b corresponding to the upper-water filtration area are communicated with the bottom of the tank 1b. The pollutant discharge pipe 4b is controlled by the pollutant discharge valve 41b, and the water discharge pipe 3b is controlled by the water discharge valve 31b. The bottoms of the bottom-water filtration area and the upper-water filtration area are center-inclined respectively.

The bottom-water filtration area is provided with a separation structure 5b, and a number of brushes 53b are arranged above the separation structure 5b in the bottom-water filtration area.

The upper-water filtration area is provided with multiple layers of filtration materials 8b, and a spacing 9b is provided between each layer of filtration materials 11a. A water outlet pipe 7b is communicated under the filtration materials 8b so that the filtered water is constantly imported to the ornamental fish tank under the action of the pump 6b.

Figure 8:
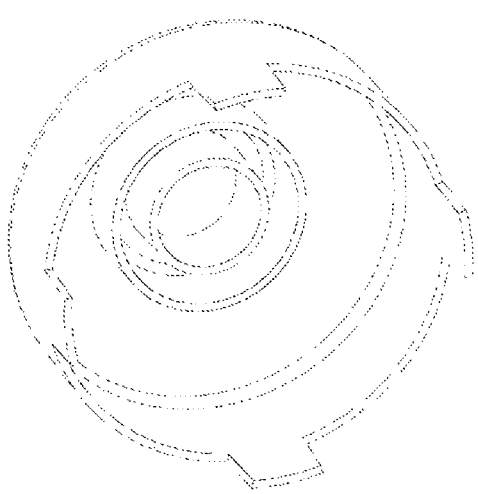
FIGS. 8 and 9 shows a schematic view of the upper closing cover of the water-pollutant separation structure according to the present invention.
Figure 9:
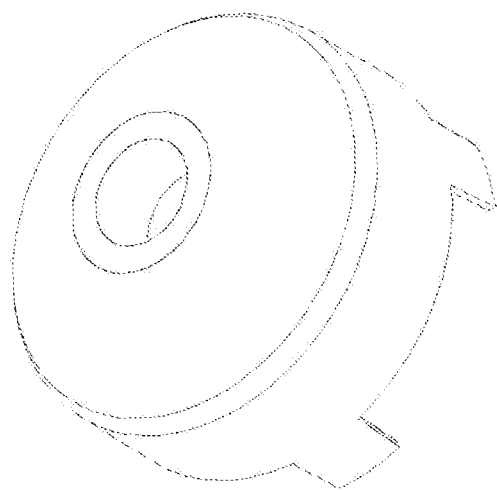
Figure 10:
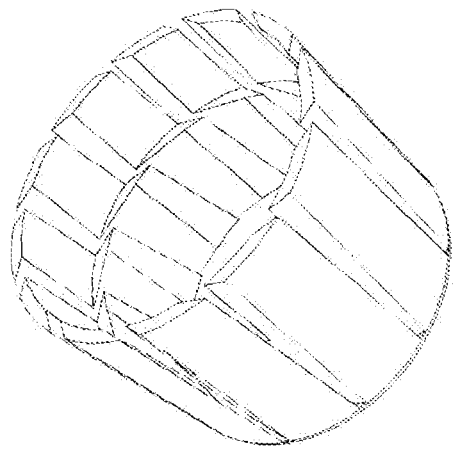
FIG. 10 shows a schematic view of the spoiler of the water-pollutant separation structure according to the present invention.

As shown in FIG. 7 to 10, FIG. 7 is a schematic view of the water-pollutant separation structure according to the present invention, and FIGS. 8 and 9 shows a schematic view of the upper closing cover of the water-pollutant separation structure according to the present invention. FIG. 10 shows a schematic view of the spoiler of the water-pollutant separation structure according to the present invention. The separation structure 5b is in such an inverted-barrel shape that has a spherical upper closing cover, a slightly smaller external dimension than that of the tank 1b, a gap from the bottom of the tank 1b, and a spoiler 51b, which is installed onto the water inlet pipe 21b after which goes through the upper closing cover of the separation structure 5b in the tank 1b. The spoiler 51b has a sealed lower-end and a plurality of slots 52b biased in the same direction on the side-wall to generate subcritical flow.

Figure 11:
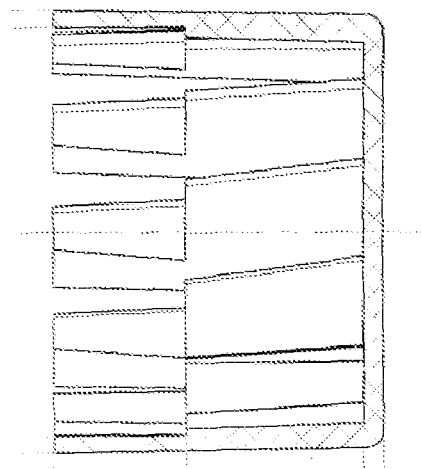
FIG. 11 shows a longitudinal-sectional view of the spoiler of the water-pollutant separation structure according to the present invention.
Figure 12:
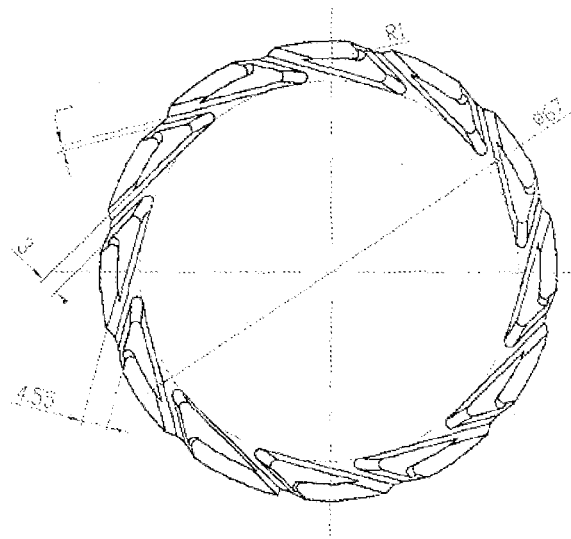
FIG. 12 shows a cross-sectional view of the spoiler of the water-pollutant separation structure according to the present invention.

As shown in FIGS. 11 to 12, FIG. 11 shows a longitudinal-sectional view of the spoiler of the water-pollutant separation structure according to the present invention, and FIG. 12 shows a cross-sectional view of the spoiler of the water-pollutant separation structure according to the present invention. The dimensions of slots 52b on the side-wall of the spoiler 51b gradually decrease from the top to the bottom. The cross-section of the spoiler 51b is provided with a round profile along the tangential direction of which the slots 52b on the side-wall of the spoiler 51b extends. The slots 52b of the spoiler are connected to the side-wall by round corners.

With the above-mentioned technical proposals, the advantage of the water-pollutant separation process is that:
1. With a weak water flow and impact force, small particles pollutant is more possible to sediment. Water shunting and water whirling both are most effective ways of gravity sedimenting. The above mentioned water-pollutant separation process combines and takes full advantage of the function of the water shunting and water swirling during the gravity sedimenting of the particles pollutant, generating smooth and swirling water flow to reach a best effect of particles pollutant gravity sedimenting separation.
2. The first level (or primary level) of particles pollutant gravity sedimenting separation is designed with a downward water flow. In this process, the particles pollutant gravity sedimenting separation is accelerated because of the superposition of the (downward) force that the smooth water flow applies to the particles pollutant and the (downward) gravity of the particles pollutant itself. So most particles pollutant will sediment as long as the gravity is greater than the force of the smooth water flow applied.
3. The next level of particles pollutant blocking and filtration separation is designed with an upward water flow, during which filtration materials block and filter rare tiny particles pollutant that did not sediment. In this process, the (downward) gravity of the particles pollutant itself weakens the (upward) force that the smooth water flow applies to the particles pollutant. The result is that a tiny (upward) resultant force acts on the tiny particles pollutant and pushes them moving upwards slowly in suspension until sedimented or absorbed to the lower surface of the filtration materials. For example, when a tiny particles pollutant is blocked by brushes, a second and a third . . . more and more tiny particles pollutant will be adhered together. Once the blocked tiny particles pollutant reach to a certain extent, they will sediment together downwards.

In another preferred embodiment, a number of spiral leaves 55b, which are biased in the same direction with the openings or slots 52b, are arranged onto the inner-wall of the water-pollutant separation structure 5b to swirl the water. Still more, filtration materials are arranged onto the inner-wall of the water-pollutant separation structure 5b.

A basic operating principle and process of this preferred embodiment is given herein below. When the device in a normal working state, the pollutant discharge pipe valve 41b and the water discharge valve 31b are turned off, and the bottom-water inlet valve 211b and the upper-water inlet valve 221b are turned on. The bottom water of the fish tank goes into the spoiler 51b through the bottom-water inlet pipe 21b inside the separation structure 5b. With the shunting function of the slots 52b, the cycling water loses impact force and becomes smooth, and then starts whirling to left under the function of the left (or right) biased slots 52b, gathering most particles pollutant of the bottom water within a central area of the bottom of the bottom-water filtration area. After that, water with remained tiny particles goes upwards slowly through the gap between the bottom-water filtration area and the separation structure 5b. So tiny particles are sedimented or absorbed when passing through the filtration materials 53b (brushes), and finally the bottom-cycling-water enters the upper-water filtration area through the opening 10b to apply a biochemistry filtration. Almost at the same time with the bottom water of the fish tank goes into the water-pollutant separation structure 5b through the bottom-water inlet pipe 21b inside the separation structure 5b, middle-water and upper-water with little particles pollutant goes into the upper-water filtration area through the upper-water inlet pipe 22b to apply a biochemistry filtration. The water entering into the water-pollutant separation structure 5b can be controlled into a certain velocity to achieve the best water-pollutant separation effect by adjusting the bottom-water inlet valve 211b and the upper-water inlet valve 221b. The cycling water in the upper-water filtration area is then sent into the fish-tank by a water pump 6b through the water outlet pipe 7b after the biochemistry filtration. Particles pollutant sedimented within the central area of the bottom of bottom-water filtration area can be easily discharged by turning on the pollutant discharge pipe valve 41b at any time. Tiny particles pollutant absorbed on the filtration materials 53b can be easily discharged out of the bottom-water filtration area with back-flush flows from the upper-water inlet pipe 22b by turning off the bottom-water inlet pipe 221b at the time of pollutant discharging.

According to the above description, the ornamental fish tank water-pollutant separation and filtration system according to the present invention has the advantage in that:
1. The particles pollutant for instance excretions from the fish is separated and discharged at the first time, and after that, water with fewer particles pollutant is applied a biochemistry filtration. Thus, the filtration system now just undertakes 20% to 30% biochemistry filtration task compared to 100% previously. The easy work of filtration now keeps the water clear, makes the fish-tank bright, and brings health to the fish.
2. Because the particles pollutant is separated and discharged, water entering the filtration system is provided with hardly any particles pollutant to block. Thus, filtration cotton is no longer a necessary for the filtration system to filter the particles pollutant for example excretions from the fish, and the filtration system no longer gets blocking and needs washing due to the accumulating of particles pollutant.

3. Because the sedimenting happens near the pollutant discharge pipe, the particles pollutant can be easily discharged by turning on the pollutant discharge pipe valve and back-flush valve at any time with less water. Preferably, the water outlet pipe and the water inlet pipe communicated to the fish tank can be controlled by a clock controlling self-acting pollutant discharge valve and an automatic water-adding device. The result is that, the work for water adding and pollutant discharging is so fully automatic that labor is no longer needed for adding water and washing the filtration system, achieving the object of keeping pet-fish so easily and joyfully.

Figure 13:
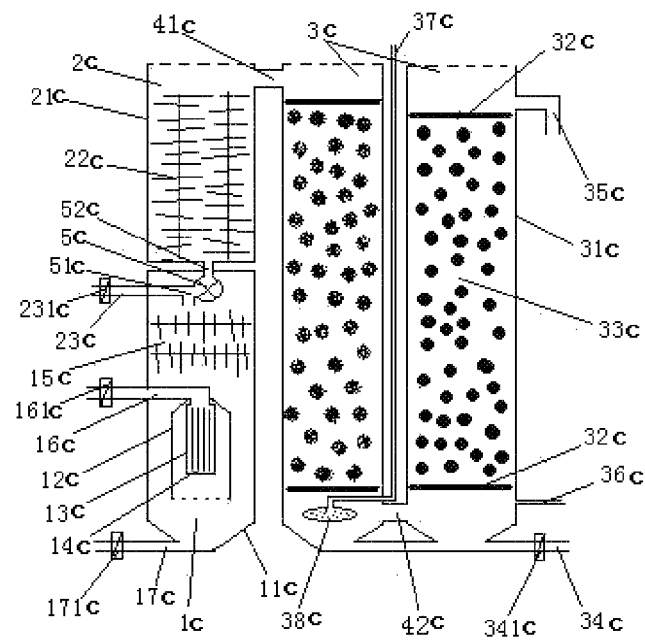
FIG. 13 is a schematic view of the one embodiment of the high-density cultivation water-pollutant separation, filtration and oxygen aeration system according to the present invention.

FIG. 13 is a schematic view of one embodiment of the high-density cultivation water-pollutant separation, filtration and oxygen aeration system according to the present invention. The high-density cultivation water-pollutant separation, filtration and oxygen aeration system can be applied to modern high-density aquiculture such as fishpond or the like, the water level of which need to be higher than the height of the water-pollutant separation tank. The high-density cultivation water-pollutant separation, filtration and oxygen aeration system of the preferred embodiment comprises a water-pollutant separation device 1c, a primary filtration device 2c communicated with the water-pollutant separation device 1c, and a secondary filtration and oxygen aeration device 3c communicated with the primary filtration device 2c.

The water-pollutant separation device 1c comprises a water-pollutant separation tank 11c and a water-pollutant separation structure 12c disposed inside the water-pollutant separation tank 11c. A bottom-water inlet pipe 16c controlled by a bottom-water inlet valve 161c is communicated with the top or the side-wall of the water-pollutant separation tank 11c, and a pollutant discharge pipe 17c controlled by a pollutant discharge pipe valve 171c is communicated with the bottom of the water-pollutant separation tank 11c. The bottom of water-pollutant separation device 1c is center-inclined, while a number of brushes 15c are arranged above the water-pollutant separation structure 12c. Because the water level of fishpond is higher than the height of the water-pollutant separation tank, the bottom water of the fishpond automatically goes through the bottom-water inlet pipe 16c into the water-pollutant separation tank 11c and starts a water-pollutant separation process.

The primary filtration device 2c of this embodiment is arranged above the water-pollutant separation device 1c. A pump 5c sucks the separated water out from the water-pollutant separation device 1c and sends into the primary filtration device 2c through the pump outtake 52c. The primary filtration device 2c comprises a primary filtration tank 21c, primary filtration materials 22c disposed inside the primary filtration tank 21c. An upper-water inlet pipe 23c is communicated with the pump intake 51c and is controlled by upper-water inlet valve 231c, so the upper-water of the fishpond is also pumped into the primary filtration device 2c by pump 5c through the upper-water inlet pipe 23c to start a primary filtration.

A secondary filtration and oxygen aeration device 3c is communicated with the primary filtration device 2c through a first opening 41c. The secondary filtration and oxygen aeration device 3c comprises a secondary filtration and oxygen aeration tank 31c, secondary filtration materials 33c disposed inside the secondary filtration and oxygen aeration tank 31c, and an oxygen aeration disk 38c. The secondary filtration and oxygen aeration tank 31c has a U-shaped structure similar with communicating vessels, where the two parts on the left and right side are communicated with each other through a second opening 42c near the bottom. The bottom of the secondary filtration and oxygen aeration tank 31c is center-inclined and communicated with a water-discharge pipe 34c that discharges water in the secondary filtration and oxygen aeration tank 31c under the control of a water-discharge pipe valve 341c. The oxygen aeration disk 38c is connected to the air supply with an oxygen aeration pipe 37c. A primary water-outlet pipe 35c and a secondary water-outlet pipe 36c are communicated with the secondary filtration and oxygen aeration tank 31c. The secondary filtration materials 33c are arranged between a pair of pollutant insulation boards that have a plurality of openings.

Also, the water-pollutant separation structure 12c of this embodiment has the same structure shown in FIG. 7 to 12 that has an inverted-barrel shape that has an spherical upper closing cover, a slightly smaller external dimension than that of the water-pollutant separation tank 11c, a gap from the bottom of the water-pollutant separation tank 11c. A spoiler 13c, which is installed onto a bottom-water inlet pipe 16c after which goes through the upper closing cover of the water-pollutant separation structure 12c in the water-pollutant separation tank 11c, has a sealed lower-end and a plurality of slots 14c biased in the same direction on the side-wall to generate subcritical flow. The dimensions of slots 14c on the side-wall of the spoiler 13c gradually decrease from the top to the bottom. The cross-section of the spoiler 13c is provided with a round profile along the tangential direction of which the slots 14c on the side-wall of the spoiler extend, and the slots 14c of the spoiler are connected to the side-wall by round corners.

With the above-mentioned technical proposals, the advantage of the water-pollutant separation process is that:

1. With a weak water flow and impact force, small particles pollutant is more possible to sediment. Water shunting and water whirling both are most effective ways of gravity sedimenting. The above mentioned water-pollutant separation process combines and takes full advantage of the function of the water shunting and water whirling during the gravity sedimenting of the particles pollutant, generating smooth and swirling water flow to reach a best effect of particles pollutant gravity sedimenting separation.

2. The first level (or primary level) of particles pollutant gravity sedimenting separation is designed with a downward water flow. In this process, the particles pollutant gravity sedimenting separation is accelerated because of the superposition of the (downward) force that the smooth water flow applies to the particles pollutant and the (downward) gravity of the particles pollutant itself. So most particles pollutant will sediment as long as the gravity is greater than the force of the smooth water flow applied.

3. The next level of particles pollutant blocking and filtration separation is designed with an upward water flow, which blocks and filters minor tiny particles pollutant that did not sediment with filtration materials. In this process, the (downward) gravity of the particles pollutant itself weakens the (upward) force that the smooth water flow applies to the particles pollutant. The result is that a tiny (upward) resultant force acts on the tiny particles pollutant and brings it moving upwards slowly in suspension until sedimented or absorbed to the lower surface of the filtration materials. For example, when a tiny particles pollutant is blocked by brushes, a second and a third . . . more and more tiny particles pollutant will be adhered together. Once the blocked tiny particles pollutant reach a certain extent, they will sediment together downwards.

In another preferred embodiment, a number of spiral leaves which are biased in the same direction with the slots 14c are arranged onto the inner-wall of the water-pollutant separation structure 12c to swirl the water. Still more, filtration materials are arranged onto the inner-wall of the water-pollutant separation structure 12c.

A basic operating principle and process of this preferred embodiment is given herein below. When the device in a normal working state, the pollutant discharge pipe valve 171c and the water discharge valve 341c are turned off, and the bottom-water inlet valve 161c and the upper-water inlet valve 231c are turned on. The bottom water of the fish tank goes into the spoiler 13c through the bottom-water inlet pipe 161c inside the separation structure 12c. With the shunting function of the slots 14c, the cycling water loses impact force and becomes smooth, and then starts whirling to left under the function of the left (or right) biased slots 14c, gathering most particles pollutant of the bottom water within a central area of the bottom of the water-pollutant separation tank 11c. After that, water with remained tiny particles goes upwards slowly through the gap between the water-pollutant separation tank 11c and the water-pollutant separation structure 12c. So tiny particles are sedimented or absorbed when passing through the filtration materials 15c (brushes), and finally the bottom-cycling-water is pumped by the water pump 5c through pump intake 51c and pump outtake 52c to the primary filtration tank 21c. At the same time, the upper water with hardly any particles pollutant is pumped by the water pump 5c through the upper-water inlet pipe 23c, the pump intake 51c and the pump outtake 52c to the primary filtration tank 21c. The cycling water entering the primary filtration tank 21c is applied a primary biochemistry filtration and a further tiny particles pollutant blocking filtration by the primary filtration materials 22c, then the cycling water enters the secondary filtration tank 31c through the first opening 41c to apply a main biochemistry filtration.

The secondary filtration tank 31c is divided into two parts to apply the biochemistry filtration. First, the cycling water goes downwards into the first part of the secondary filtration tank 31c to apply a biochemistry filtration. Oxygen is supplied continuously by the oxygen aeration disk 38c and the oxygen aeration pipe 37c. The contact time between the water and the oxygen is significantly extended due to the blocking effect of the secondary filtration materials 33c, thus a high oxygen dissolved cycling water is obtained because of the fully contact and convection. This high oxygen dissolved cycling water can active the biological bacterium to grow and flourish in a short time, during which a large quantity of organic matter is decomposed that doubled the effect of biochemistry filtration. After that, the cycling water from the first part of the secondary filtration tank 31c enters the second part through the second opening 42c to apply the biochemistry filtration, and finally return into the fish-pond through the primary water-outlet pipe 35c and the secondary water-outlet pipe 36c.

The water entering into the water-pollutant separation structure 12c can be controlled into a certain velocity to achieve the best water-pollutant separation effect by adjusting the bottom-water inlet valve 161c and the upper-water inlet valve 231c. Particles pollutant sedimented within the central area of the bottom of the water-pollutant separation tank 11c can be easily discharged by turning on the pollutant discharge pipe valve 171c at any time. Tiny particles pollutant absorbed on the bushes 15c can be easily discharged out of the water-pollutant separation tank 11c with back-flush flows from the upper-water inlet pipe 23c by turning off the bottom-water inlet pipe 161c at the time of pollutant discharging. Similarly, tiny particles pollutant absorbed on the primary filtration materials 22c can also be easily discharged out of the water-pollutant separation tank 11c with back-flush flows from the primary filtration tank by turning off the bottom-water inlet pipe 161c, the upper-water inlet valve 231c, and the water pump 5c at the time of pollutant discharging.

Figure 14:
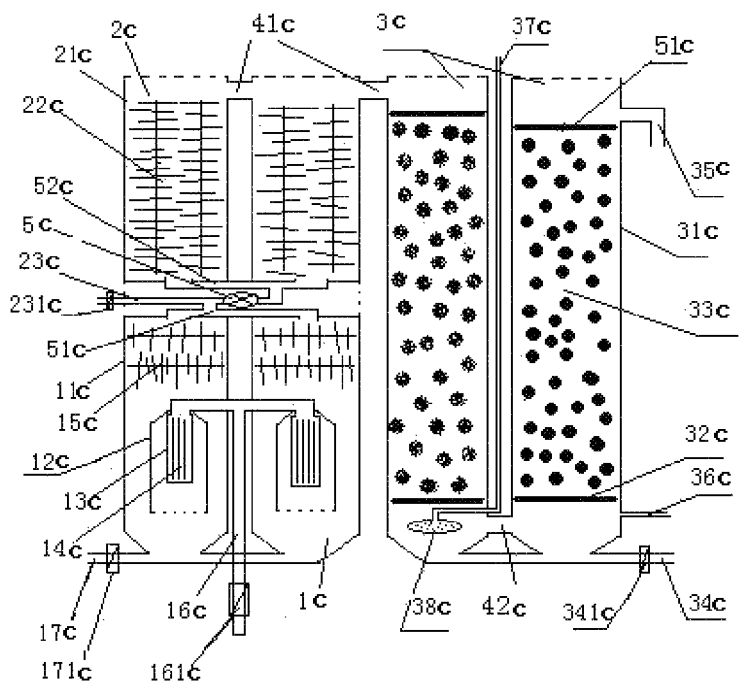
FIG. 14 is a schematic view of another embodiment of the high-density cultivation water-pollutant separation, filtration and oxygen aeration system having a twin-separation structure according to the present invention.

As shown in FIG. 14, the high-density cultivation water-pollutant separation, filtration and oxygen aeration system of this embodiment can also have several water-pollutant separation devices 1c, or several primary filtration device 2c, or several secondary filtration and oxygen aeration device 3c cooperating together in parallel to improve the effect of the water-pollutant separation, filtration and oxygen aeration.

The above descriptions are meant to be exemplary only and are not limited to the examples shown in the drawings and described hereinbefore, and those skilled in the art will recognize that changes may be made to the embodiments described without department from the scope of the invention disclosed. Still other modifications varied in efficient manners within the scope of the present invention and their technical equivalents will be apparent to those skilled in the art, in light of a review of this disclosure, and such modifications are intended to fall within the appended claims.

What is claimed is:

1. A water-pollutant separation device, comprising a tank (1a), a water inlet pipe (2a) and a water outlet pipe (3a) respectively communicated with the top of the tank (1a), and a pollutant discharge pipe (4a) communicated with the bottom of the tank (1a), is characterized in that the inner cavity of the tank (1a) is provided with a separation structure (5a) being in such an inverted-barrel shape that has an open bottom, an upper closing cover, a smaller external dimension than that of the tank (1a), a gap from the bottom of the tank (1a), and a spoiler (51a), which is installed onto the water inlet pipe (2a) after which goes through the upper closing cover of the separation structure (5a) in the tank (1a), having a sealed lower-end and a plurality of openings on the side-wall to generate subcritical flow to spoil the water flow.

2. The water-pollutant separation device of claim 1, wherein, a width dimension of each of the openings on the side-wall of the spoiler (51a) gradually decreases from the top of the opening to the bottom of the opening.

3. The water-pollutant separation device of claim 1, wherein, the upper closing cover of the separation structure (5a) has a spherical appearance.

4. The water-pollutant separation device of claim 1, wherein, each of the openings on the side wall of the spoiler (51a) are biased in a common rotational direction.

5. The water-pollutant separation device of claim 1, wherein, a number of spiral leaves (52a), which are biased in the same direction with the openings, are arranged onto the inner-wall of the separation structure (5a) to swirl the water.

6. The water-pollutant separation device of claim 1, wherein, the inner-wall of the separation structure (5a) is provided with filtration materials (52a).

7. A water-pollutant separation and filtration device comprising a tank (1a), a water inlet pipe (2a) and a water outlet pipe (3a) respectively communicated with the top of the tank (1a), a pump (6a), a pollutant discharge pipe (4a) communicated with the bottom of the tank (1a), and a back-flush pipe (22a) provided with a back-flush valve (221a) communicating the water inlet pipe (2a) and the water outlet pipe (3a), wherein, an upper inner cavity of the tank (1a) is provided with multiple layers of filtration materials (11a);

a lower inner cavity of the tank (1a) is provided with a separation structure (5a) being in such an inverted-barrel shape that has an open bottom, an upper closing cover, a smaller external dimension than that of the tank (1a), a gap from the bottom of the tank (1a), and a spoiler (51a), which is installed onto the water inlet pipe (2a) after which goes through the upper closing cover of the separation structure (5a) in the tank (1a), having a sealed lower-end and a plurality of openings on the side-wall biased in the same direction to generate a subcritical flow to spoil the water flow.

8. The water-pollutant separation and filtration device of claim 7, wherein, the lower layers of filtration materials (11a) have a less density than the upper layers of filtration materials (11a), and a net spacing (12a) is provided between each layer of filtration materials (11a).

9. A water-pollutant separation device comprising:
a tank comprising an inner cavity;
a water inlet;
a separation structure defining a volume, the separation structure comprising a spoiler in fluid communication with the water inlet, the spoiler comprising a sealed lower end and a sidewall having a plurality of openings in fluid communication with the volume, the separation structure oriented within said inner cavity having a gap between the separation structure and a bottom of the tank, the separation structure having an open bottom in fluid communication with the inner cavity;

a water outlet in communication with a portion of the inner cavity located above the separation structure; and a pollutant discharge outlet in communication a portion of the inner cavity located below the separation structure.

10. The water-pollutant separation device of claim 9, wherein a width dimension of each opening gradually decreases from a top of the opening to a bottom of the opening.

11. The water-pollutant separation device of claim 9, wherein said sidewall of said spoiler comprises a plurality of vanes separated by said openings.

12. The water-pollutant separation device of claim 9, wherein each opening comprises the same shape.

13. The water-pollutant separation device of claim 9, wherein each opening is biased in a common rotational direction with respect to a central axis of said spoiler.

14. The water-pollutant separation device of claim 9, wherein a top portion of said separation structure comprises curvature.

15. The water-pollutant separation device of claim 9, wherein an inner sidewall of said separation structure comprises spiral leaves.

16. The water-pollutant separation device of claim 9, wherein an inner sidewall of said separation structure comprises filtration materials.

17. The water-pollutant separation device of claim 9, comprising filtration materials located in said portion of the inner cavity located above the separation structure.

* * * * *